US012799432B2

(12) United States Patent
Creutz et al.

(10) Patent No.: US 12,799,432 B2
(45) Date of Patent: Nov. 17, 2026

(54) LAUNDRY DETERGENT FORMULATION

(71) Applicant: Dow Silicones Corporation, Midland, MI (US)

(72) Inventors: Serge Creutz, Liege (BE); Rahma Benbakoura, Quaregnon (BE); Jacqueline L'hostis, Silly (BE); Flore Vandemeulebroucke, Manage (BE); Saugata Nad, Brussels (BE)

(73) Assignee: Dow Silicones Corporation, Midland, MI (US)

( * ) Notice: Subject to any disclaimer, the term of this patent is extended or adjusted under 35 U.S.C. 154(b) by 299 days.

(21) Appl. No.: 18/700,298

(22) PCT Filed: Oct. 25, 2022

(86) PCT No.: PCT/US2022/047625
§ 371 (c)(1),
(2) Date: Apr. 11, 2024

(87) PCT Pub. No.: WO2023/076190
PCT Pub. Date: May 4, 2023

(65) Prior Publication Data

US 2025/0223520 A1 Jul. 10, 2025

Related U.S. Application Data

(60) Provisional application No. 63/272,697, filed on Oct. 28, 2021.

(51) Int. Cl.
*C11D 3/37* (2006.01)
*C11D 3/22* (2006.01)
*C11D 17/00* (2006.01)

(52) U.S. Cl.
CPC .............. *C11D 3/373* (2013.01); *C11D 3/225* (2013.01); *C11D 17/0086* (2013.01); *C11D 2111/12* (2024.01)

(58) Field of Classification Search
CPC ..... C11D 3/373; C11D 3/225; C11D 17/0086; C11D 2111/12
See application file for complete search history.

(56) References Cited

U.S. PATENT DOCUMENTS

| | | | | |
|---|---|---|---|---|
| 4,810,253 | A | 3/1989 | Kasprzak et al. | |
| 4,848,981 | A | 7/1989 | Kasprzak et al. | |
| 6,974,789 | B1 | 12/2005 | Whitaker et al. | |
| 2012/0065118 | A1 | 3/2012 | Paul et al. | |
| 2014/0352076 | A1* | 12/2014 | Song | C11D 3/0026 510/347 |
| 2021/0108159 | A1* | 4/2021 | Stenger | C11D 3/0026 |

FOREIGN PATENT DOCUMENTS

| | | |
|---|---|---|
| EP | 0578424 | 1/1994 |
| EP | 1075864 | 2/2001 |

OTHER PUBLICATIONS

Bartelmus, "Die Analytik von Celluloseathergruppen", Fresenius Zeitschrift fuer Analytische Chemie, 1977, vol. 286, p. 161-190.
Sibilia, "A Guide to Materials Characterization and Chemical Analysis", 1988, p. 81-84.
Yau, "Modern Size Exclusion Chromatography", Wiley-Interscience, 1979.

* cited by examiner

*Primary Examiner* — Angela C Brown-Pettigrew
*Assistant Examiner* — Brittany Sharon Harris
(74) *Attorney, Agent, or Firm* — Thomas S. Deibert

(57) ABSTRACT

A laundry detergent formulation is provided including a detergent component; optionally, a crosslinked cellulose ether; and a drainage aid component, wherein the drainage aid component comprises: 40-99 wt % of an organopolysiloxane comprising: 0-60 mol % units of formula I $$R_x^1SiO_{(4-x)/2} \quad (I)$$

40-100 mol % units of formula II $$R_y^1R_z^2SiO_{(4-y-z)/2} \quad (II)$$

wherein x is 0-3; y is 0-2; and z is 1-2; y+z is 1-3; $R^1$ is a hydrogen, hydroxy or group having 1-8 carbon atoms; $R^2$ is an $-A_cR^3$ group; A is a divalent linking group; c is 0-1; $R^3$ is a group having 9-35 carbon atoms; 1-30 wt % of an organosilicon resin; 0-30 wt % of a hydrophobic additive; with proviso that when the laundry detergent formulation contains ≥0.02 wt % of the drainage aid component, the laundry detergent formulation will also contain at least 0.1 wt % of the crosslinked cellulose ether containing 0.1-0.6 wt % of polyether groups.

9 Claims, No Drawings

LAUNDRY DETERGENT FORMULATION

The present invention relates to a laundry detergent formulation. In particular, the present invention relates to a laundry detergent formulation incorporating a detergent component, wherein the detergent component comprises a detergent surfactant; optionally, a crosslinked cellulose ether; and a drainage aid component, wherein the drainage aid component comprises: 40 to 99 wt % of an organopolysiloxane comprising: 0 to 60 mol % of units of formula I $$R_x^1SiO_{(4-x)/2} \quad (I)$$

40 to 100 mol % of units of formula II $$R_y^1R_z^2SiO_{(4-y-z)/2} \quad (II)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein $R^1$ is a hydrogen, a hydroxy group or a group having 1-8 carbon atoms; wherein $R^2$ is an $-A_cR^3$ group; wherein A is a divalent linking group; wherein c is 0 or 1; wherein $R^3$ is a group having 9-35 carbon atoms; 1 to 30 wt % of an organosilicon resin; 0 to 30 wt % of a hydrophobic additive; with proviso that when the laundry detergent formulation contains ≥0.02 wt % of the drainage aid component, the laundry detergent formulation will also contain at least 0.1 wt % of the crosslinked cellulose ether containing 0.1 to 0.6 wt % of polyether groups.

There is increasing pressure from governments and consumers to improve the energy efficiency of daily activities such as cleaning laundry. A historical approach to improving the energy efficiency of cleaning laundry has been the development of laundry detergent formulations that offer cleaning at reduced washing temperatures. However, consumers are increasingly exhibiting a tendency to increase the temperature of the wash having a perception that higher wash temperatures will better facilitate the killing of contaminant microbes present in the laundry.

Accordingly, there remains a desire to find alternative ways to reduce the energy needed to do laundry. One approach to further improve the energy efficiency of the laundry process would be to reduce the energy required to dry laundry after washing. A way to achieve that end involves the enhanced removal of residual water from the laundry during the spinning cycle leaving fabrics drier when removed from the washer. Drier fabrics out of the washer would result in less water requiring removal during the drying process. In addition, better removal of residual water from the fabrics might also anticipated to reduce malodor; particularly when drying is performed in under humid conditions (e.g., line drying during the wet season).

Another approach to further improve the energy efficiency of the laundry process is to provide the detergent formulation in a condensed form, preferably, in a solid format that helps in reducing transportation costs associated with certain liquid formats. For example, detergent formulations in tablet form provide several advantages over formulations provided in liquid form; for example, ease of dosing, storage, transportation and handling.

Detergent formulations in tablet form are typically prepared by premixing ingredients of the detergent formulation and then forming the premixed ingredients into tablets using suitable equipment, for example a tablet press. The detergent tablets are typically formed using compression of the components to provide tablets that are sufficiently robust to facilitate transportation and handling without damage. In addition to robustness, the detergent tablets must still dissolve quickly enough such that the detergent ingredients may be released into the wash water as soon as possible at the beginning of the wash cycle.

A dichotomy persists in conventional formulations. Higher compressive force used in preparation of the detergent tablets generally correlates to improved robustness. While lower compressive force used in preparation of the detergent tablets generally correlates to improved (more rapid) dissolution in the wash water. This dichotomy is compounded by the fact that conventional detergent tablet formulations tend to exhibit relatively poor long term storage stability; which has historically been compensated for via the use of a higher compression specification during manufacture.

One detergent tablet composition is described by Whitaker et al U.S. Pat. No. 6,974,789. Whitaker et al. discloses a detergent tablet for use in a washing machine, the tablet having two or more phases at least one of which comprises one or more of the following: a) a polymeric disintegrant having a particle size distribution such that at least 90% by weight thereof has a particle size below about 0.3 mm and at least 30% by weight thereof has a particle size below about 0.2 mm; or b) a water soluble hydrated salt having a solubility in distilled water of at least about 25 g/100 g at 25 °C; wherein said salt is selected from hydrates of sodium acetate, sodium metaborate, sodium orthophosphate, sodium dihydrogenphosphate, disodium hydrogen phosphate, sodium potassium tartrate, potassium aluminum sulphate, calcium bromide, calcium nitrate, sodium citrate, potassium citrate and mixtures thereof; and wherein said detergent tablet comprises: i) a first phase in the form of a shaped body having at least one mold therein, the shaped body being compressed at a pressure of at least 250 $kg/cm^2$; and ii) a second phase is in the form of a compressed particulate solid affixed within said mold, the compressed particulate solid being compressed at a pressure of less than about 350 $kg/cm^2$.

Hence, there remains a need for new laundry detergent formulations that facilitate a reduction in the energy demand associated with the washing of laundry. In particular, there remains a need for new laundry detergent formulations that enhance the removal of residual water from fabrics during the rinse cycle and/or reduce the transportation costs associated with distribution of the laundry detergent formulations to consumers.

The present invention provides a laundry detergent formulation, comprising: 50 to <99.992 wt %, based on weight of the laundry detergent formulation, of a detergent component, wherein the detergent component comprises a detergent surfactant; 0 to 25 wt %, based on weight of the laundry detergent formulation, of a crosslinked cellulose ether containing 0.1 to 0.6 wt %, based on weight of the crosslinked cellulose ether, of polyether groups; and >0.008 to 25 wt %, based on weight of the laundry detergent formulation, of a drainage aid component, wherein the drainage aid component comprises: 40 to 99 wt %, based on weight of the drainage aid component, of an organopolysiloxane comprising: 0 to 60 mol %, of the organopolysiloxane, of units of formula I $$R_x^1SiO_{(4-x)/2} \quad (I)$$

40 to 100 mol %, of the organopolysiloxane, of units of formula II $$R_y^1R_z^2SiO_{(4-y-z)/2} \quad (II)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^1$ is independently selected from a hydrogen, a hydroxy group and a group having 1 to 8 carbon atoms; wherein each $R^2$ is an $-A_cR^3$ group; wherein A is a divalent linking group; wherein c is selected from the group consisting of 0 and 1; wherein each $R^3$ is independently selected from a group having 9 to 35 carbon atoms; 1 to 30 wt %, based on weight of the drainage aid component, of an organosilicon resin; and 0 to 30 wt %, based on weight of the drainage aid component, of a hydrophobic additive; with proviso that when the laundry detergent formulation contains ≥0.02 wt %, based on weight of the laundry detergent formulation, of the drainage aid component, the laundry detergent formulation will also contain at least 0.1 wt %, based on weight of the laundry detergent formulation, of the crosslinked cellulose ether containing 0.1 to 0.6 wt %, based on weight of the crosslinked cellulose ether, of polyether groups.

The present invention provides a laundry detergent formulation, comprising: 50 to <99.992 wt %, based on weight of the laundry detergent formulation, of a detergent component, wherein the detergent component comprises a detergent surfactant; 0 to 25 wt %, based on weight of the laundry detergent formulation, of a crosslinked cellulose ether containing 0.1 to 0.6 wt %, based on weight of the crosslinked cellulose ether, of polyether groups; and >0.008 to <0.02 wt %, based on weight of the laundry detergent formulation, of a drainage aid component, wherein the drainage aid component comprises: 40 to 99 wt %, based on weight of the drainage aid component, of a linear organopolysiloxane of formula III (III)

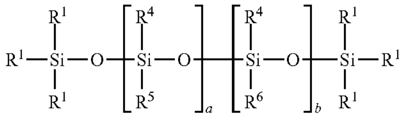

wherein each R is a methyl group; wherein each R is independently selected from the group consisting of an $R^1$, an $R^5$ and an $R^6$; wherein each $R^5$ is an $-A_cR^7$ group; wherein each $R^7$ is independently selected from an acyclic group having 10 to 20 carbon atoms; wherein c is selected from the group consisting of 0 and 1; and wherein A is a divalent linking group consisting of (i) oxygen; (ii) carbon and hydrogen or (iii) carbon, hydrogen, oxygen, and optionally, nitrogen, sulfur or phosphorus; wherein each $R^6$ is independently selected from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; wherein a is 10 to 500; wherein b is 0 to 250; wherein a+b is 10 to 500; wherein a>b; and wherein ≥60 mol % of the Si atoms in the linear organopolysiloxane of formula III have an $R^5$ group attached.

The present invention provides a laundry detergent formulation, comprising: 50 to <99.992 wt %, based on weight of the laundry detergent formulation, of a detergent component, wherein the detergent component comprises a detergent surfactant; 0.1 to 25 wt %, based on weight of the laundry detergent formulation, of a crosslinked cellulose ether containing 0.1 to 0.6 wt %, based on weight of the crosslinked cellulose ether, of polyether groups; and >0.008 to 25 wt %, based on weight of the laundry detergent formulation, of a drainage aid component, wherein the drainage aid component comprises: 40 to 99 wt %, based on weight of the drainage aid component, of an organopolysiloxane comprising: 0 to 60 mol %, of the organopolysiloxane, of units of formula I $$R_x^1SiO_{(4-x)/2} \quad (I)$$

40 to 100 mol %, of the organopolysiloxane, of units of formula II $$R_y^1R_z^2SiO_{(4-y-z)/2} \quad (II)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^1$ is independently selected from a hydrogen, a hydroxy group and a group having 1 to 8 carbon atoms; wherein each $R^2$ is an $-A_cR^3$ group; wherein A is a divalent linking group; wherein c is selected from the group consisting of 0 and 1; wherein each $R^3$ is independently selected from a group having 9 to 35 carbon atoms; 1 to 30 wt %, based on weight of the drainage aid component, of an organosilicon resin; and 0 to 30 wt %, based on weight of the drainage aid component, of a hydrophobic additive; with proviso that when the laundry detergent formulation contains ≥0.02 wt %, based on weight of the laundry detergent formulation, of the drainage aid component, the laundry detergent formulation will also contain at least 0.1 wt %, based on weight of the laundry detergent formulation, of the crosslinked cellulose ether containing 0.1 to 0.6 wt %, based on weight of the crosslinked cellulose ether, of polyether groups.

The present invention provides a method of washing a soiled fabric article, comprising: providing a soiled fabric article; providing a laundry detergent formulation according to the present invention; providing a wash water; providing a rinse water; applying the wash water and the laundry detergent formulation to the soiled fabric article to provide a washed fabric article; and rinsing the washed fabric article with the rinse water.

DETAILED DESCRIPTION

Surprisingly, laundry detergent formulations comprising a drainage aid component of the present invention facilitate exceptional water removal from laundry during the rinse cycle; providing the opportunity for significant energy savings. In addition, it has surprisingly been found that detergent tablet formulations of the present invention including a crosslinked cellulose ether containing 0.1 to 0.6 wt %, based on weight of the crosslinked cellulose ether, of polyether groups; exhibit significantly higher tensile properties compared to conventional binder/structurant ingredients while simultaneously demonstrating good dissolution properties with equivalent primary cleaning performance. Moreover, incorporation of the crosslinked cellulose ether containing 0.1 to 0.6 wt %, based on weight of the crosslinked cellulose ether; allows for the substitution of water for propylene glycol conventionally used in detergent tablet formulations; significantly reducing the cost of the formulation and improving its environmental profile of the detergent tablet formulation while simultaneously maintaining equivalent primary cleaning performance.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "phosphate-free" as used herein and in the appended claims means compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of phosphate (measured as elemental phosphorus).

The term "DS" as used herein and in the appended claims means the number of alkyl substituted OH groups per anhydroglucose unit in a cellulose ether, as determined by the Zeisel Method.

The term "DS (methyl)" or "DS (M)" as used herein and in the appended claims means the number of methyl substituted OH groups per anhydroglucose unit in a cellulose ether, as determined by the Zeisel Method.

The term "MS" as used herein and in the appended claims means the number of moles of etherification reagent which are bound as ether per mol of anhydroglucose unit as hydroxyalkyl substituents in a cellulose ether, as determined by the Zeisel Method.

The term "MS (hydroxyethyl)" or "MS (HE)" as used herein and in the appended claims means the number of moles of etherification reagent which are bound as ether per mol of anhydroglucose unit as hydroxyethyl substituents in a cellulose ether, as determined by the Zeisel Method.

The term "MS (hydroxypropyl)" or "MS (HP)" as used herein and in the appended claims means the number of moles of etherification reagent which are bound as ether per mol of anhydroglucose unit as hydroxypropyl substituents in a cellulose ether, as determined by the Zeisel Method.

The term "Zeisel Method" refers to the Zeisel cleavage procedure for determination of M S and D S. See G. Bartelmus and R. Ketterer, *Zeitschriftfuer Analytische Chemie*, Vol. 286 (1977, Springer, Berline, DE), pages 161-190.

Preferably, the laundry detergent formulation of the present invention is selected from the group consisting of a liquid laundry detergent, a laundry detergent tablet (or pearl), a granulated laundry detergent, a powder laundry detergent, a unit dose laundry detergent, and a hybrid monodose laundry detergent with at least one powder and at least one liquid chamber. More preferably, the laundry detergent formulation of the present invention is in a solid format selected from the group consisting of a laundry detergent tablet (or pearl), a granulated laundry detergent and a powder laundry detergent. Most preferably, the laundry detergent formulation of the present invention is a powder laundry detergent. The laundry detergent formulation of the present invention may optionally be encapsulated within a water soluble (or dispersible) film in a unit dose format.

Preferably, the laundry detergent formulation of the present invention, comprises: 50 to <99.992 wt % (preferably, 74.98 to 99.891 wt %; more preferably, 79.981 to 99.491 wt %; most preferably, 84.983 to 94.988 wt %), based on weight of the laundry detergent formulation, of a detergent component, wherein the detergent component comprises a detergent surfactant; 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; and >0.008 to 25 wt % (preferably, >0.008 to <0.02 wt %; more preferably, 0.009 to 0.019 wt %; most preferably, 0.012 to 0.017 wt %), based on weight of the laundry detergent formulation, of a drainage aid component, wherein the drainage aid component comprises: 40 to 99 wt % (preferably, 55 to 99 wt %; more preferably, 65 to 98 wt %; most preferably, 77 to 97 wt %), based on weight of the drainage aid component, of an organopolysiloxane comprising: 0 to 60 mol % of units of formula I and 40 to 100 mol % of units of formula II $$R_x^1SiO_{(4-x)/2} \quad (I)$$

$$R_y^1R_z^2SiO_{(4-y-z)/2} \quad (II)$$

wherein x is selected from the group consisting of 0, 1, 2 and 3; wherein y is selected from the group consisting of 0, 1 and 2 (preferably, 0 and 1; more preferably, 1); wherein z is selected from the group consisting of 1 and 2 (preferably, 1); with the proviso that y+z is 1, 2 or 3 (preferably, 2); wherein each $R^1$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group)(preferably, wherein ≤one $R^1$ per Si is a hydroxy group); wherein each $R^2$ is an $-A_cR^3$ group; wherein A is a divalent linking group; wherein c is selected from the group consisting of 0 and 1 (preferably, 1); wherein each $R^3$ is independently selected from a group having 9 to 35 carbon atoms (preferably, 10 to 30 carbon atoms; more preferably, 10 to 20 carbon atoms; most preferably, 10 to 15 carbon atoms); 1 to 30 wt % (preferably, 1 to 25 wt %; more preferably, 2 to 20 wt %; most preferably, 3 to 15 wt %), based on weight of the drainage aid component, of an organosilicon resin; 0 to 30 wt % (preferably, 0 to 20 wt %; more preferably, 0 to 15 wt %; most preferably, 0 to 8 wt %), based on weight of the drainage aid component, of a hydrophobic additive; with proviso that when the laundry detergent formulation contains ≥0.02 wt %, based on weight of the laundry detergent formulation, of the drainage aid component, the laundry detergent formulation will also contain at least 0.1 wt %, based on weight of the laundry detergent formulation, of the crosslinked cellulose ether containing 0.1 to 0.6 wt %, based on weight of the crosslinked cellulose ether, of polyether groups.

Preferably, the laundry detergent formulation of the present invention, comprises: 50 to <99.992 wt % (preferably, 74.98 to 99.891 wt %; more preferably, 79.981 to 99.491 wt %; most preferably, 84.983 to 94.988 wt %), based on weight of the laundry detergent formulation, of a detergent component; wherein the detergent component comprises a detergent surfactant; wherein the detergent surfactant is selected from the group consisting of anionic surfactants, nonionic surfactants, cationic surfactants, amphoteric surfactants and mixtures thereof. More preferably, the laundry detergent formulation of the present invention, comprises: 5 to 65 wt % (preferably, 7.5 to 60 wt %; most preferably, 10 to 50 wt %), based on weight of the laundry detergent formulation, of the detergent surfactant. Still more preferably, the laundry detergent formulation of the present invention, comprises: 5 to 65 wt % (preferably, 7.5 to 60 wt %; most preferably, 10 to 50 wt %), based on weight of the laundry detergent formulation, of a detergent surfactant; wherein the detergent surfactant is selected from the group consisting of anionic surfactants, nonionic surfactants, cationic surfactants, amphoteric surfactants and mixtures thereof. Most preferably, the laundry detergent formulation of the present invention, comprises: 5 to 65 wt % (preferably, 7.5 to 60 wt %; most preferably, 10 to 50 wt %), based on weight of the laundry detergent formulation, of a detergent surfactant; wherein the detergent surfactant is selected from the group consisting of a mixture including an anionic surfactant and a nonionic surfactant.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-20}$ alkyl polyethoxy sulfates and mixtures thereof. More preferred anionic surfactants include $C_{10-13}$ alkyl benzene sulfonic acid, $C_{10-13}$ alkyl benzene sulfonate, $C_{10-13}$ paraffin-sulfonic acid, $C_{10-13}$ paraffin-sulfonate, $C_{10-13}$ alkyl polyethoxy sulfate and mixtures thereof. Most preferred anionic surfactants include $C_{10-13}$ alkyl benzene sulfonate.

Non-ionic surfactants include alkoxylates, polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include alkoxylates. More preferred non-ionic surfactants are according to formula A (A)

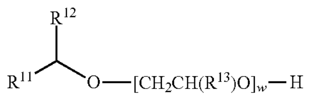

wherein w is an average of 5 to 40 (preferably, 7 to 27; more preferably, 8 to 20; most preferably, 7 to 12); wherein $R^{11}$ is selected from the group consisting of a hydrogen and a linear or branched $C_{1-20}$ alkyl group (preferably, a hydrogen, and a linear or branched $C_{1-15}$ alkyl group; more preferably, a linear $C_{1-15}$ alkyl group); wherein $R^{12}$ is selected from the group consisting of a linear or branched $C_{1-20}$ alkyl group and a linear or branched $C_{1-4}$ hydroxyalkyl group (preferably, a linear or branched $C_{1-15}$ alkyl group and a linear or branched $C_{1-4}$ hydroxyalkyl group; more preferably, a linear $C_{1-15}$ alkyl group and a linear or branched $C_{1-3}$ hydroxyalkyl group; most preferably, a linear $C_{1-15}$ alkyl group); wherein each $R^{13}$ is independently selected from the group consisting of a hydrogen, a methyl group, an ethyl group, a n-propyl group, an iso-propyl group, a n-butyl group, a 2-butyl group and a 2-methyl-2-butyl group (preferably, a hydrogen, a methyl group and an ethyl group; more preferably, a hydrogen and a methyl group; most preferably, a hydrogen); and with the proviso that sum of the total number of carbon atoms in $R^{11}$ and $R^{12}$ is 5 to 21 (preferably, 6 to 20 carbon atoms; more preferably, 7 to 18 carbon atoms; most preferably, 11 to 15 carbon atoms). Still more preferred nonionic surfactants are according to formula I; wherein w is an average of 8 to 16; wherein $R^{11}$ is selected from the group consisting of a hydrogen and a linear $C_{1-15}$ alkyl group; wherein $R^{12}$ is selected from the group consisting of a linear or branched $C_{1-15}$ alkyl group and a linear or branched $C_{1\_4}$ hydroxyalkyl; wherein $R^{13}$ is selected from the group consisting of a hydrogen, a methyl group and an ethyl group; and with the proviso that the sum of the total number of carbon atoms in $R^{11}$ and $R^{12}$ is 6 to 20. Most preferred nonionic surfactants are according to formula I; wherein w is an average of 7 to 12; wherein $R^{11}$ is selected from the group consisting of a hydrogen and a linear $C_{1-15}$ alkyl group; wherein $R^{12}$ is selected from the group consisting of a linear $C_{1-15}$ alkyl group and a linear or branched $C_{1-3}$ hydroxyalkyl group; wherein $R^{13}$ is a hydrogen; and with the proviso that the sum of the total number of carbon atoms in $R^{11}$ and $R^{12}$ is 7 to 18.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-24}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the laundry detergent formulation of the present invention, comprises: >0.008 to 25 wt % (preferably, >0.008 to <0.02 wt %; more preferably, 0.009 to 0.019 wt %; most preferably, 0.012 to 0.017 wt %), based on weight of the laundry detergent formulation, of a drainage aid component, wherein the drainage aid component comprises: 40 to 99 wt % (preferably, 55 to 99 wt %; more preferably, 65 to 98 wt %; most preferably, 77 to 97 wt %), based on weight of the drainage aid component, of an organopolysiloxane; 1 to 30 wt % (preferably, 1 to 25 wt %; more preferably, 2 to 20 wt %; most preferably, 3 to 15 wt %), based on weight of the drainage aid component, of an organosilicon resin; and 0 to 30 wt % (preferably, 0 to 20 wt %; more preferably, 0 to 15 wt %; most preferably, 0 to 8 wt %), based on weight of the drainage aid component, of a hydrophobic additive; with proviso that when the laundry detergent formulation contains ≥0.02 wt %, based on weight of the laundry detergent formulation, of the drainage aid component, the laundry detergent formulation will also contain at least 0.1 wt %, based on weight of the laundry detergent formulation, of the crosslinked cellulose ether containing 0.1 to 0.6 wt %, based on weight of the crosslinked cellulose ether, of polyether groups.

Preferably, the drainage aid component, of the present invention, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane comprises: 0 to 60 mol % of units of formula I and 40 to 100 mol % of units of formula II $$R_x^1SiO_{(4-x)/2} \qquad (I)$$

$$R_y^1R_z^2SiO_{(4-y-z)/2} \qquad (II)$$

wherein x is selected from the group consisting of 0, 1, 2 and 3; wherein y is selected from the group consisting of 0, 1 and 2 (preferably, 0 and 1; more preferably, 1); wherein z is selected from the group consisting of 1 and 2 (preferably, 1); with the proviso that y+z is 1, 2 or 3 (preferably, 2); wherein each $R^1$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group)(preferably, wherein ≤one $R^1$ per Si is a hydroxy group); wherein each $R^2$ is an $-A_cR^3$ group; wherein A is a divalent linking group; wherein c is selected from the group consisting of 0 and 1 (preferably, 0); wherein each $R^3$ is independently selected from a group having 9 to 35 carbon atoms (preferably, 10 to 30 carbon atoms; more preferably, 10 to 20 carbon atoms; most preferably, 10 to 15 carbon atoms)(preferably, wherein each $R^3$ contains 0 to 1 oxygen atoms; more preferably, wherein each $R^3$ contains no oxygen atoms)(preferably, wherein each $R^3$ contains 0 nitrogen atoms)(preferably, wherein at least 50 mol % (preferably, 65 to 100 mol %; more preferably, 70 to 100 mol %; most preferably, 75 to 100 mol %) of the units of formula II in the organopolysiloxane contain at least one $R^2$). More preferably, the drainage aid component, of the present invention, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane is a linear organopolysiloxane of formula III

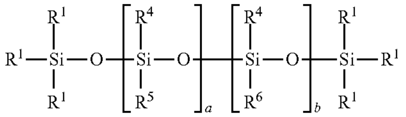

(III)

wherein each $R^1$ is independently selected from a hydrogen, a hydroxy and a group having 1 to 8 carbon atoms (preferably, a $C_{1-4}$ alkyl group; more preferably, a $C_{1-2}$ alkyl group; most preferably, a methyl group)(preferably, wherein ≤one $R^1$ per Si is a hydroxy group); wherein each $R^4$ is independently selected from the group consisting of a hydrogen, a group having 1 to 8 carbon atoms, an $R^5$ and an $R^6$ (preferably, wherein each $R^4$ is independently selected from the group consisting of a hydrogen and a group having 1 to 8 carbon atoms; more preferably, wherein each $R^4$ is independently selected from a $C_{1-4}$ alkyl group; still more preferably, wherein each $R^4$ is independently selected from a $C_{1-2}$ alkyl group; most preferably, wherein each $R^4$ is a methyl group); wherein each $R^5$ is independently selected from an acyclic group having 9 to 35 carbon atoms (preferably, 10 to 30 carbon atoms; more preferably, 10 to 20 carbon atoms; most preferably, 10 to 15 carbon atoms)(preferably, wherein each $R^5$ contains 0 to 1 oxygen atoms; more preferably, wherein each $R^5$ contains no oxygen atoms)(preferably, wherein each $R^5$ contains 0 nitrogen atoms); wherein each $R^6$ is independently selected from an alkylaryl group; wherein a is 10 to 500; wherein b is 0 to 250; wherein a +b is 10 to 500 (preferably, 25 to 250; more preferably, 30 to 100; most preferably, 45 to 75)(preferably, wherein a>b; more preferably, wherein a>b)(preferably, wherein ≥60 mol % (preferably, ≥65 mol %; more preferably, ≥70 mol %; most preferably, ≥75 mol %) of the Si atoms in the linear organopolysiloxane of formula I have an $R^5$ group attached)(preferably, wherein b=0). Most preferably, the drainage aid component, of the present invention, comprises: 40 to 99 wt % (preferably, 55 to 99 wt %; more preferably, 65 to 98 wt %; most preferably, 77 to 97 wt %), based on weight of the drainage aid component, of an organopolysiloxane; wherein the organopolysiloxane is a linear organopolysiloxane of formula III; wherein each $R^1$ is independently selected from a hydrogen, a hydroxy group and a group having 1 to 8 carbon atoms (preferably, a $C_{1-4}$ alkyl group; more preferably, a $C_{1-2}$ alkyl group; most preferably, a methyl group)(preferably, wherein ≤one R per Si is a hydroxy group); wherein each $R^4$ is independently selected from the group consisting of a hydrogen, a group having 1 to 8 carbon atoms, an $R^5$ and an $R^6$ (preferably, wherein each $R^4$ is independently selected from the group consisting of a hydrogen and a group having 1 to 8 carbon atoms; more preferably, wherein each $R^4$ is independently selected from a $C_{1-4}$ alkyl group; still more preferably, wherein each $R^4$ is independently selected from a $C_{1-2}$ alkyl group; most preferably, wherein each $R^4$ is a methyl group); wherein each $R^5$ is an $-A_cR^7$ group; wherein each $R^7$ is independently selected from an acyclic group having 9 to 35 carbon atoms (preferably, an acyclic $C_{10-30}$ alkyl group; more preferably, an acyclic $C_{10-20}$ alkyl group; most preferably, an acyclic $C_{10-15}$ alkyl group)(preferably, wherein each $R^7$ is a hydrocarbyl group); wherein c is selected from the group consisting of 0 and 1

(preferably, wherein c is 0); and wherein A is a divalent linking; wherein each $R^6$ is a —$YR^8$ group; wherein Y is selected from the group consisting of a divalent alkylene group having 2 to 10 (preferably, 2 to 4; more preferably, 2) carbon atoms and 0 to 2 (preferably, 0 to 1; more preferably, 0) oxygen atoms; and wherein $R^8$ is at least one —$C_6R^9{}_6$ aromatic ring; wherein each $R^9$ is independently selected from a hydrogen, a halogen, a hydroxyl, a $C_{1-6}$ alkoxy group, a $C_{1-12}$ alkyl group or wherein two or more $R^9$ groups together represent a divalent hydrocarbon group joining together two or more aromatic rings (preferably, wherein each $R^6$ is independently selected from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; most preferably, α-methyl styrene); wherein a is 10 to 500; wherein b is 0 to 250; wherein a +b is 10 to 500 (preferably, 25 to 250; more preferably, 30 to 100; most preferably, 45 to 75)(preferably, wherein a>b; more preferably, wherein a>b)(preferably, wherein ≥60 mol % (preferably, ≥65 mol %; more preferably, ≥70 mol %; most preferably, ≥75 mol %) of the Si atoms in the linear organopolysiloxane of formula III have an $R^5$ group attached)(preferably, wherein b=0).

Preferably, the organopolysiloxane of the drainage aid component has a degree of polymerization of 10 to 500. More preferably, the organopolysiloxane of the drainage aid component has a degree of polymerization of 25 to 250. Still more preferably, the organopolysiloxane of the drainage aid component has a degree of polymerization of 30 to 100. Most preferably, the organopolysiloxane of the drainage aid component has a degree of polymerization of 45 to 75.

Preferably, the organopolysiloxane of the drainage aid component is a linear organopolysiloxane; wherein the linear organopolysiloxane comprises <0.1 wt % (preferably, <0.01 wt %; more preferably, <0.001 wt %; most preferably, <detectable limit) of trifunctional siloxane units. Preferably, the organopolysiloxane is a linear organopolysiloxane; wherein the linear organopolysiloxane comprises <0.1 wt % (preferably, <0.01 wt %; more preferably, <0.001 wt %; most preferably, <the detectable limit) of trifunctional siloxane units; and wherein the linear organopolysiloxane comprises <the detectable limit of aromatic moieties (e.g., α-methyl styrene moieties).

Preferably, when the organopolysiloxane of the drainage aid component, of the present invention, is a linear organopolysiloxane of formula III; the laundry detergent formulation comprises 0.0057 to 0.018 wt % (preferably, 0.007 to 0.017 wt %; more preferably, 0.0089 to 0.016 wt %; most preferably, 0.009 to 0.015 wt %), based on weight of the laundry detergent formulation, of the linear organopolysiloxane of formula III.

The divalent linking group, A, when present in the organopolysiloxane of the drainage aid component, preferably consists of (i) oxygen; (ii) carbon and hydrogen; or (iii) carbon, hydrogen, oxygen and optionally nitrogen, sulfur and/or phosphorus. Oxygen when present in the divalent linking group, A, is selected from the group consisting of an ether oxygen, an ester oxygen, a substituted hydroxyl, a substituted alkoxy group and a combination thereof. Nitrogen when present in the divalent linking group, A, is selected from the group consisting of an amino group, an amido group and combinations thereof. The divalent linking group, A, when present in the organopolysiloxane is preferably selected from the group consisting of alkylene ester groups, alkylene ether groups, amide groups, polyamino/amido groups and mercapto groups, such as, —O—, —$CH_2CH_2OC$(=O)—, —$CH_2CH_2OCH_2CH(OH)$—, —$(CH_2)_3NHC$(=O)—, —$(CH_2)_3NHCH_2C$(=O)—, —$CH_2CH_2S$— and

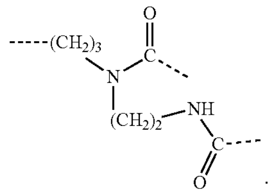

.

Preferably, the organopolysiloxane of the drainage aid component is nonionic.

Preferably, the drainage aid component, of the present invention, comprises: 1 to 30 wt % (preferably, 1 to 25 wt %; more preferably, 2 to 20 wt %; most preferably, 3 to 15 wt %), based on weight of the drainage aid component, of an organosilicon resin; wherein the organosilicon resin is comprised primarily of $R_3{}^{10}SiO_{1/2}$ and $SiO_{4/2}$ units (i.e., M and Q units, respectively); wherein each $R^{10}$ is selected from the group consisting of a functional or non-functional, substituted or unsubstituted monovalent radical (preferably, a hydroxyl group, a hydrocarbon group and a hydrocarbonoxy group). The number ratio of the M groups to Q groups is preferably 0.4:1 to 2.5:1 (more preferably, 0.4:1 to 1.5:1; most preferably, 0.5:1 to 1.1:1). While the organosilicon resin preferably contains only M and Q units, the organosilicon resin may include a limited number of $R_2{}^{10}SiO_{2/2}$ and $R^{10}SiO_{3/2}$ units (i.e., D and T units, respectively). Preferably, the organosilicon resin is an MQ silicone resin. As used herein, the term "MQ silicone resin" means that, on average, no more than 20 mole percent (preferably, no more than 15 mole percent; more preferably, no more than 10 mole percent; still more preferably, no more than 5 mole percent; most preferably, no more than 1 mole percent) of the organosilicon units are comprised of D and T units.

Preferably, the drainage aid component, of the present invention, comprises: 0 to 30 wt % (preferably, 0 to 20 wt %; more preferably, 0 to 15 wt %; most preferably, 0 to 8 wt %), based on weight of the drainage aid component, of a hydrophobic additive; wherein hydrophobic additive is selected from the group consisting of silica, titania, alumina, ground quartz, magnesium oxide, zinc oxide, salts of aliphatic carboxylic acids (e.g., calcium or aluminum stearates), reaction products of isocyanates with certain cyclohexylamine and alkyl amides (e.g., ethylene or methylene bis stearamide). More preferably, the drainage aid component, of the present invention, comprises: 0 to 30 wt % (preferably, 0 to 20 wt %; more preferably, 0 to 15 wt %; most preferably, 0 to 8 wt %), based on weight of the drainage aid component, of a hydrophobic additive; wherein the hydrophobic additive is selected from silica particles. Most preferably, the drainage aid component, of the present invention, comprises: 0 to 30 wt % (preferably, 0 to 20 wt %; more preferably, 0 to 15 wt %; most preferably, 0 to 8 wt %), based on weight of the drainage aid component, of a hydrophobic additive; wherein hydrophobic additive is selected from silica particles having an average particle size of 0.1 to 50 μm (preferably, 1 to 20 μm) and a surface area of at least 50 $m^2/g$. The silica particles may be rendered hydrophobic, e.g., by treating with dialkylsilyl groups and/ or trialkylsilyl groups either bonded directly onto the silica or by means of a silicone resin. Preferably, the silica particles are rendered hydrophobic with dimethyl and/or trimethyl silyl groups. The silica materials may be selected from fumed silica, precipitated silica, hydrothermal silica and gel formation silica.

Preferably, the drainage aid component contains <0.1 wt %, based on weight of the drainage aid component, of a hydrophobic particulate material (e.g., silica, titania, alumina, ground quartz, magnesium oxide, zinc oxide, salts of aliphatic carboxylic acids (e.g., calcium or aluminium stearates), reaction products of isocyanates with certain materials (for example cyclohexylamine and alkyl amides, e.g., ethylene or methylene bis stearamide).

Preferably, the drainage aid component optionally contains an optional material selected from the group consisting of a binder/encapsulant (e.g., a polyacrylic binder), a surfactant and a solid carrier.

Binders/encapsulants used in the drainage aid component of the present invention may include polyoxyalkylene polymers (e.g., polyethylene glycol, which can be applied molten or as an aqueous solution and spray dried); reaction products of tallow alcohol and ethylene oxide or polypropylene glycol; polycarboxylates (e.g., polyacrylic acid, partial sodium salts of polyacrylic acid, copolymers of acrylic acid and maleic anhydride); cellulose ethers (e.g., sodium carboxymethylcellulose); gelatin; agar; microcrystalline waxes; fatty acids or fatty alcohols having 12 to 20 carbon atoms and a melting point in the range 45 to 80 °C; a monoester of glycerol with such a fatty acid; a mixture of a water insoluble wax having a melting point of 55 to 100 °C and a water-insoluble emulsifying agent, glucose or hydrogenated glucose.

Surfactant used in the drainage aid component of the present invention is selected to facilitate dispersal of the organopolysiloxane from the binder/encapsulant. Silicone glycols are preferred surfactants for use in combination with many binder/encapsulants. Fatty alcohol ether sulphates or linear alkylbenzene sulphonates are preferred for use in combination with polyacrylic acid type binder/encapsulants. The surfactant may be added to the organopolysiloxane of the drainage aid component undiluted or in emulsion before the organopolysiloxane is mixed with the binder/encapsulant, or the surfactant and the organopolysiloxane may successively be added to the binder/encapsulant.

Solid carrier used in the drainage aid component of the present invention are preferably selected from zeolites (e.g. Zeolite A, Zeolite X), aluminosilicates, silicates (e.g., magnesium silicate), phosphates (e.g., powdered or granular sodium tripolyphosphate), sodium sulphate, sodium carbonate, sodium perborate, a cellulose derivative (e.g., sodium carboxymethylcellulose), granulated starch, clay, sodium citrate, sodium acetate, sodium bicarbonate and native starch.

Preferably, the laundry detergent formulation of the present invention, comprises: 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is a mixed cellulose ether containing hydroxyalkyl ether groups and alkyl ether groups.

More preferably, the laundry detergent formulation of the present invention, comprises: 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof. Most preferably, the laundry detergent formulation of the present invention, comprises: 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is hydroxyethyl methylcellulose.

Preferably, the laundry detergent formulation of the present invention, comprises: 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; wherein the crosslinked cellulose either is an irreversibly crosslinked cellulose ether. More preferably, the laundry detergent formulation of the present invention, comprises: 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is a mixed cellulose ether containing hydroxyalkyl ether groups and alkyl ether groups and wherein the crosslinked cellulose either is an irreversibly crosslinked cellulose ether. Still more preferably, the laundry detergent formulation of the present invention, comprises: 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof and wherein the crosslinked cellulose either is an irreversibly crosslinked cellulose ether. Most preferably, the laundry detergent formulation of the present invention, comprises: 0 to 25 wt % (preferably, 0.1 to 25 wt %; more preferably, 0.5 to 20 wt %; most preferably, 5 to 15 wt %), based on weight of the laundry detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is hydroxyethyl methylcellulose and wherein the crosslinked cellulose either is an irreversibly crosslinked cellulose ether.

Preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups. More preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups; wherein the polyether groups are polyoxyalkylene groups having 2 to 100 (preferably, 2 to 20; more preferably, 3 to 15) oxyalkylene groups per crosslink. Most preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups; wherein the polyether groups are polyoxypropylene groups having 2 to 100 (preferably, 2 to 20; more preferably, 3 to 15) oxypropylene groups per crosslink.

Preferably, crosslinked cellulose ether comprises a base cellulose ether having crosslinks containing 0.1 to 0.6 wt %, based on weight of the crosslinked cellulose ether, of polyether groups. Preferably, the base cellulose ether is selected from hydroxyalkyl cellulose ethers, alkyl cellulose ethers and combinations thereof. Examples of base cellulose ethers include, for example, methylcellulose, ethylcellulose, propylcellulose, butylcellulose, hydroxyethyl methylcellulose, hydroxypropyl methylcellulose, hydroxyethylcellulose, ethylhydroxyethylcellulose, methylethylhydroxyethylcellulose, hydrophobically modified ethylhydroxyethylcellulose, hydrophobically modified hydroxyethylcellulose, sulfoethyl methylhydroxyethylcellulose, sulfoethyl methylhydroxypropylcellulose and sulfoethyl hydroxyethylcellulose. Preferably, the base cellulose ethers are mixed cellulose ethers that contain both hydroxyalkyl ether groups and alkyl ether groups, such as, alkyl hydroxyethyl cellulose and hydroxyalkyl methylcellulose (e.g., hydroxyethyl methylcellulose, hydroxypropyl methylcellulose, methyl hydroxyethyl hydroxypropylcellulose and ethylhydroxyethyl cellulose).

Preferably, the base cellulose ether contains hydroxyalkyl ether substitutions. More preferably, the base cellulose ether has a degree of hydroxyethyl ether substitutions, MS (HE), or hydroxypropyl ether substitutions, MS (HP), of 1.5 to 4.5 (preferably, 2.0 to 3.0).

Preferably, the base cellulose ether contains methyl ether substitutions. More preferably, the base cellulose ether has a degree of methyl ether substitution, DS (M), of 1.2 to 2.1 (preferably, 1.3 to 1.7; more preferably, 1.35 to 1.60).

Preferably, the base cellulose ether is a mixed cellulose ether containing hydroxyalkyl ether substitutions and alkyl ether substitutions. More preferably, the base cellulose ether is a mixed cellulose ether having a degree of hydroxyethyl ether substitution, MS (HE), of 0.05 to 0.75 (preferably, 0.15 to 0.45; more preferably, 0.20 to 0.40) and a degree of methyl ether substitution, DS (M), of 1.2 to 2.1 (preferably, 1.3 to 1.7, more preferably, 1.35 to 1.60).

Preferably, the base cellulose ether is a mixed cellulose ether containing hydroxyalkyl ether substitutions and alkyl ether substitutions. More preferably, the base cellulose ether is a mixed cellulose ether having a degree of hydroxypropyl ether substitution, MS (HP), of 0.1 to 1.5 (preferably, 0.2 to 1.2) and a degree of methyl ether substitution, DS (M), of 1.2 to 2.1 (preferably, 1.3 to 2.0).

Preferably, the crosslinked cellulose ether comprises a base cellulose ether having crosslinks containing 0.1 to 0.6 wt %, based on weight of the crosslinked cellulose ether, of polyether groups; wherein the base cellulose ether is a hydroxyethyl methyl cellulose and wherein the crosslinks are polyoxypropylene dioxyethylene ether crosslinks, such as those produced as the reaction product of hydroxyethyl methyl cellulose with polypropylene glycol (PPG) glycidylether.

Crosslinking agents used to crosslink the base cellulose ether to form the crosslinked cellulose ether include compounds having a polyoxyalkylene or polyalkylene glycol group and two or more (preferably, two) crosslinking groups, such as, halogen groups, glycidyl or epoxy groups, and ethylenically unsaturated groups (e.g., vinyl groups) that form ether bonds with the base cellulose ether to form the crosslinked cellulose ether. Preferably, the crosslinking agent is selected from the group consisting of 1,2-dichloro (poly)alkoxy ethers, dichloropolyoxyethylene, diglycidyl polyalkoxy ethers, diglycidyl phosphonate, divinyl polyoxyalkylenes containing a sulphone group. Crosslinking agents having two different types of functional groups can be used. Examples include diglycidyl polyoxypropylenes and glycidyl(poly)oxyalkyl methacrylate. Preferably, the crosslinking agent contains 2 to 100 (preferably, 2 to 20; more preferably, 3 to 15) oxyalkylene groups per molecule.

Preferably, the amount of crosslinking agent included in the crosslinked cellulose ether ranges from 0.0001 to 0.05 eq (preferably, 0.0005 to 0.01 eq; more preferably, 0.001 to 0.005 eq), wherein the unity "eq" represents the molar ratio of moles of the crosslinking agent relative to the number of moles of anhydroglucose units (AGU) in the base cellulose ether.

Preferably, the crosslinked cellulose ether is an irreversibly crosslinked cellulose ether. That is, the crosslinks in the crosslinked cellulose ether do not break down during the intended use of the crosslinked cellulose ether under normal conditions. In contrast, reversible crosslinks will break down during the intended use of the crosslinked cellulose ether under normal conditions. An example of reversible crosslinks in cellulose ethers intended for use in laundry detergent formulations are those created using aldehyde based crosslinkers (e.g., glyoxal), which crosslinks break down upon dissolution of the crosslinked material in water.

Preferably, the laundry detergent formulation of the present invention comprises <0.5 wt % (preferably, <0.01 wt %; more preferably, <0.001 wt %; still more preferably, <0.0001 wt %; most preferably, <the detectable limit), based on weight of the laundry detergent formulation, of crosslinked carboxymethylcellulose.

Preferably, the detergent component of the present invention, further comprises at least one ingredient selected from the group consisting of a builder, a filler, an enzyme, a pigment, a colorant, a solvent, a binder, a bleaching agent, a bleach activator, a stabilizer, a foam regulator, an optical brightener, a processing aid and a fragrance.

Preferably, the detergent component of the present invention, further comprises 0 to 60 wt %, based on weight of the laundry detergent formulation, of a builder. More preferably, the detergent component of the present invention, comprises: 0 to 60 wt %, based on weight of the laundry detergent formulation, of a builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylene-phosphonic acid; salts of ethylenediaminetetraethylene-phosphonic acid; oligomeric phosphonates; polymeric phosphonates; mixtures thereof. Most preferably, the detergent component of the present invention, comprises: 0 to 60 wt %, based on weight of the laundry detergent formulation, of a builder; wherein the builder includes a citrate (preferably, sodium citrate).

Preferably, the detergent component of the present invention, further comprises 0 to 74 wt %, based on weight of the laundry detergent formulation, of a filler. More preferably, the detergent component of the present invention, further comprises 0 to 74 wt %, based on weight of the laundry detergent formulation, of a filler; wherein the filler includes at least one of sodium sulfate, sodium chloride, calcite and dolomite. Most preferably, the detergent component of the present invention, further comprises 0 to 74 wt %, based on weight of the laundry detergent formulation, of a filler; wherein the filler is selected from the group consisting of sodium sulfate, sodium chloride, calcite, dolomite and mixtures thereof.

Preferably, the detergent component of the present invention, further comprises 0 to 2 wt % (preferably, 0.1 to 2 wt %), based on weight of the laundry detergent formulation, of an enzyme. More preferably, the detergent component of the present invention, further comprises 0 to 2 wt % (preferably, 0.1 to 2 wt %), based on weight of the laundry detergent formulation, of an enzyme; wherein the enzyme is selected from the group consisting of a protease, a cellulase, a amylase, a mannanase, a lipase and mixtures thereof. Most preferably, the detergent component of the present invention, further comprises 0 to 2 wt % (preferably, 0.1 to 2 wt %), based on weight of the laundry detergent formulation, of an enzyme; wherein the enzyme includes a mixture of a protease, an amylase and a mannanase.

Preferably, the detergent component of the present invention, optionally further comprises a solvent. More preferably, the detergent component of the present invention, optionally further comprises 0 to 75 wt % (preferably, 0.1 to 75 wt %; more preferably, 5 to 72 wt %; most preferably, 15 to 70 wt %), based on weight of the laundry detergent formulation, of a solvent. Still more preferably, the detergent component of the present invention, optionally further comprises 0 to 75 wt % (preferably, 0.1 to 75 wt %; more preferably, 5 to 72 wt %; most preferably, 15 to 70 wt %), based on weight of the laundry detergent formulation, of a solvent; wherein the solvent is selected from the group consisting of water, an organic solvent and mixtures thereof. Yet more preferably, the detergent component of the present invention, optionally further comprises 0 to 75 wt % (preferably, 0.1 to 75 wt %; more preferably, 5 to 72 wt %; most preferably, 15 to 70 wt %), based on weight of the laundry detergent formulation, of a solvent; wherein the solvent is selected from the group consisting of water, an organic solvent and mixtures thereof; wherein the organic solvent is selected from the group consisting of an aliphatic alcohol (e.g., $C_{1-6}$ alkanols, $C_{1-6}$ alkyl diols); a monoalkylene glycol ether (e.g., ethylene glycol propyl ether, ethylene glycol n-butyl ether, ethylene glycol t-butyl ether, propylene glycol propyl ether, propylene glycol n-butyl ether, propylene glycol t-butyl ether, propylene glycol methyl ether acetate, propylene glycol diacetate); a polyalkylene glycol ether (e.g., diethylene glycol ethyl ether, diethylene glycol propyl ether, diethylene glycol n-butyl ether, diethylene glycol t-butyl ether, diethylene glycol hexyl ether, dipropylene glycol methyl ether, dipropylene glycol ethyl ether, dipropylene glycol propyl ether, dipropylene glycol n-butyl ether, dipropylene glycol t-butyl ether, dipropylene glycol phenyl ether, dipropylene glycol methyl ether acetate, tripropylene glycol methyl ether, tripropylene glycol ethyl ether, tripropylene glycol propyl ether, tripropylene glycol n-butyl ether, tripropylene glycol t-butyl ether) and mixtures thereof. Most preferably, the detergent component of the present invention, optionally further comprises 0 to 75 wt % (preferably, 0.1 to 75 wt %; more preferably, 5 to 72 wt %; most preferably, 15 to 70 wt %), based on weight of the laundry detergent formulation, of a solvent; wherein the solvent is selected from (i) water, (ii) a mixture of water and dipropylene glycol n-butyl ether and (iii) a mixture of propylene glycol and dipropylene glycol n-butyl ether.

Preferably, the detergent component of the present invention, optionally further comprises a binder. More preferably, the detergent component of the present invention, optionally further comprises 0 to 30 wt % (preferably, 0.1 to 30 wt %; more preferably, 5 to 25 wt %; most preferably, 10 to 20 wt %), based on weight of the laundry detergent formulation, of a binder. Still more preferably, the detergent component of the present invention, optionally further comprises 0 to 30 wt % (preferably, 0.1 to 30 wt %; more preferably, 5 to 25 wt %; most preferably, 10 to 20 wt %), based on weight of the laundry detergent formulation, of a binder; wherein the binder is selected from the group consisting of $C_{10-20}$ alcohol ethoxylates containing 5 to 100 moles of ethylene oxide per mole of alcohol (preferably, $C_{15-20}$ primary alcohol ethoxylates containing 20 to 100 moles of ethylene oxide per mole of alcohol); polyvinylpyrrolidones with an average molecular weight of 12,000 to 700,000 Daltons; polypropylene glycols with an average molecular weight of 600 to 5,000,000 Daltons (preferably, 1,000 to 400,000 Daltons; more preferably, 1,000, to 10,000 Daltons); polyethylene glycols with an average molecular weight of 600 to 5,000,000 Daltons (preferably, 1,000 to 400,000 Daltons; more preferably, 1,000, to 10,000 Daltons); copolymers of maleic anhydride with ethylene, methylvinyl ether or methacrylic acid, wherein the maleic anhydride comprises at least 20 mole percent of the copolymer; $C_{10-20}$ mono and diglycerol ethers; $C_{10-20}$ fatty acids; cellulose derivatives such as methyl cellulose, carboxymethyl cellulose and hydroxyethyl cellulose; homo and copolymeric polycarboxylic acids and salts thereof; and mixtures thereof. Most preferably, the detergent component of the present invention, optionally further comprises 0 to 30 wt % (preferably, 0.1 to 30 wt %; more preferably, 5 to 25 wt %; most preferably, 10 to 20 wt %), based on weight of the laundry detergent formulation, of a binder; wherein the binder is a polyethylene glycols with an average molecular weight of 600 to 5,000,000 Daltons (preferably, 1,000 to 400,000 Daltons; more preferably, 1,000, to 10,000 Daltons).

Preferably, the detergent component of the present invention, further comprises 0 to 10 wt %, based on weight of the laundry detergent formulation, of a bleaching agent. Preferred bleaching agents include, for example, sodium perborate and sodium percarbonate.

Preferably, the detergent component of the present invention, further comprises 0 to 10 wt %, based on weight of the laundry detergent formulation, of a bleach activator. Preferred bleach activators include, for example, tetra acetyl ethylene diamine (TAED) and sodium nonanoyloxybenzene sulfonate (NOBS).

Preferably, the detergent component of the present invention, further comprises 0 to 1 wt %, based on weight of the laundry detergent formulation, of a stabilizer. Preferred stabilizers include, for example, phosphonates.

Preferably, the detergent component of the present invention, optionally further comprises a foam regulator. More preferably, the detergent component of the present invention, optionally further comprises a foam regulator; wherein the foam regulator is selected from the group consisting of organomodified silicones, polydimethyl silicones and fatty acids. Most preferably, the detergent component of the present invention, optionally further comprises a foam regulator; with the proviso that when the foam regulator is an organomodified silicone, said organomodified silicone is compositionally different from that included in the drainage aid component.

Preferably, the detergent component of the present invention, further comprises 0 to 0.3 wt %, based on weight of the laundry detergent formulation, of an optical brightener. Preferred optical brighteners include, for example, fluorescent whitening agents.

Preferably, the detergent component of the present invention, further comprises 0 to 2 wt % (preferably, 0.01 to 2 wt %), based on weight of the laundry detergent formulation, of a fragrance.

Preferably, the detergent component of the present invention, further comprises a solvent and a binder; wherein the laundry detergent formulation is a laundry detergent tablet. More preferably, the detergent component of the present invention, further comprises a solvent, a binder, a fragrance and an enzyme; wherein the laundry detergent formulation is a laundry detergent tablet. Most preferably, the detergent component of the present invention, further comprises 0.1 to 40 wt % (preferably, 5 to 35 wt %; more preferably, 15 to 30 wt %), based on weight of the laundry detergent formulation, of a solvent; 0.1 to 30 wt % (preferably, 5 to 25 wt %; more preferably, 10 to 20 wt %), based on weight of the laundry detergent formulation, of a binder; 0.01 to 2 wt %, based on weight of the laundry detergent formulation, of a fragrance; and 0.05 to 2 wt %, based on weight of the laundry detergent formulation, of an enzyme; wherein the laundry detergent formulation is a laundry detergent tablet.

Preferably, the method of washing a soiled fabric article of the present invention, comprises: providing a soiled fabric article (preferably, wherein the soiled fabric article comprises cotton; more preferably, wherein the soiled fabric article is selected from cotton and a polyester cotton blend); providing a wash water; providing a rinse water; providing a laundry detergent formulation of the present invention; applying the wash water and the laundry detergent formulation to the soiled fabric article to provide a washed fabric article; and then rinsing the washed fabric article with the rinse water. More preferably, the method of washing a soiled fabric article of the present invention, comprises: providing a soiled fabric article (preferably, wherein the soiled fabric article comprises cotton; more preferably, wherein the soiled fabric article is selected from cotton and a polyester cotton blend); providing a wash water; providing a rinse water; providing a laundry detergent formulation of the present invention; applying the wash water and the laundry detergent formulation to the soiled fabric article to provide a washed fabric article; rinsing the washed fabric article with the rinse water; and then extracting the rinse water from the washed fabric (preferably, spinning the rinse water from the washed fabric in a machine rinse cycle). Most preferably, the method of washing a soiled fabric article of the present invention, comprises: providing a soiled fabric article (preferably, wherein the soiled fabric article comprises cotton; more preferably, wherein the soiled fabric article is selected from cotton and a polyester cotton blend); providing a wash water; providing a rinse water; providing a laundry detergent formulation of the present invention; applying the wash water and the laundry detergent formulation to the soiled fabric article to provide a washed fabric article; rinsing the washed fabric article with the rinse water; and then extracting the rinse water from the washed fabric article in a machine rinse cycle; wherein the weight of residual water entrained with the washed fabric article at completion of the machine rinse cycle using the laundry detergent formulation of the present invention containing the drainage aid component divided by the weight of residual water entrained with the washed fabric article at the completion of the machine rinse cycle using the same laundry detergent formulation without the drainage aid component is ≤0.7 (preferably, ≤0.6; more preferably, ≤0.55; most preferably, ≤0.5).

Some embodiments of the present invention will now be described in detail in the following Examples.

Comparative Example C1 and Examples 1-2: Organopolysiloxanes

The organopolysiloxanes of Comparative Example C1 and Examples 1-2 having the general formula

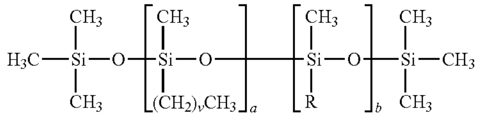

wherein the values of R, a, b and v are reported in TABLE 1.

TABLE 1

| Ex. | R | a | b | v |
|---|---|---|---|---|
| Comp. Example C1 | α-methyl styrene | 48 | 12 | 1 |
| Example 1 | α-methyl styrene | 48 | 12 | 11 |
| Example 2 | — | 60 | — | 11-13 |

Example AFC1-AFC2: Antifoam Component

An antifoam composition comprising the ingredients as noted in TABLE 2 was prepared by homogenizing the ingredients in a dental mixer set at 3,500 rpm for 30 seconds and then in a high shear mixer (silverson) set at 6,000 rpm for one minute.

TABLE 2

| | Example | |
|---|---|---|
| Ingredient | AFC1 (wt %) | AFC2 (wt %) |
| Comparative Example C1 | 87.3 | — |
| Distilled palm kernel fatty acid[a] | — | 100 |
| MQ silicone resin[b] | 6.7 | — |
| Precipitated $SiO_2$[c] | 6.0 | — |

[a]FA Palmera B1220 available from KLK OLEO

[b]Trimethylsilylated resin with a total M/Q ratio of 0.96/1 dissolved at 60% in octyl stearate

[c]SIPERNAT ® D 10 (≥97% precipitated $SiO_2$ having a d50 particle size of 6.5 μm) available from Evonik

Example AFG1: Antifoam Granules

An antifoam granule was prepared by combining the antifoam component from Example AFC1 with the other ingredients as noted in TABLE 3. The binder and dodecylbenzene sulfonic acid were weighed into a container and homogenized with a mechanical stirrer (10 min/400 rpm). The water and the antifoam component were then added to the contents of the container with agitation. The contents of the container were then poured onto the zeolite carrier in a food mixer. The mixture was then dried in a fluidized bed over 20 minutes at 60 °C and sieved between 250 μm and 1,400 μm to provide the product antifoam granules.

TABLE 3

| Ingredient | Example AFG1 (wt %) |
|---|---|
| Polyacrylic binder[1] | 13.96 |
| Dodecylbenzene sulfonic acid (DBSA)[2] | 1.80 |
| Water | 11.02 |
| Example AFC1 | 9.53 |
| Zeolite carrier[3] | 63.69 |

[1]Sokalan PA 25 PN~54 wt % solids in water available from BASF
[2]Marlon AS3 available from Sasol
[3]Sodium aluminum silicate available from PQ

Examples 3-4: Drainage Aid Components

Drainage aid components of Examples 3-4 comprising the ingredients noted in TABLE 4 were prepared by homogenizing the ingredients in a dental mixer set at 3,500 rpm for 30 seconds and then in a high shear mixer (silverson) set at 6,000 rpm for one minute.

TABLE 4

| | Ingredient | | | |
|---|---|---|---|---|
| Example | Organopolysiloxane | wt % | Resin | wt % |
| 3 | Example 1 | 80.0 | MQ silicone resin[a] | 20.0 |
| 4 | Example 2 | 80.0 | MQ silicone resin[a] | 20.0 |

[a]Trimethylsilylated resin with an M/Q ratio of 0.96/1 with weight average molecular weight of 19,000 Daltonds dispersed at 60% in octyl stearate

Examples 5-6: Drainage Aid Granules

The product drainage aid components of Examples 3-4 were individually combined with the other ingredients as noted in TABLE 5 and compounded into drainage aid granules in Examples 5-6, respectively, as noted in TABLE 6. The binder and dodecylbenzene sulfonic acid (DSBA) were weighed into a container and homogenized with a mechanical stirrer (10 min/400 rpm). The water and the drainage aid component were then added to the contents of the container with agitation. The contents of the container were then poured onto the zeolite carrier in a food mixer. The mixture was then dried in a fluidized bed over 20 minutes at 60

TABLE 5

| Ingredient | wt % |
|---|---|
| Polyacrylic binder[1] | 13.96 |
| Dodecylbenzene sulfonic acid (DBSA)[2] | 1.80 |
| Water | 11.02 |
| Product drainage aid component | 9.53 |
| Zeolite carrier[3] | 63.69 |

[1]Sokalan PA 25 PN~54 wt % solids in water available from BASF
[2]Marlon AS3 available from Sasol
[3]Sodium aluminum silicate available from PQ

TABLE 6

| Granulated drainage aid | Drainage aid component |
|---|---|
| Example 5 | Example 3 |
| Example 6 | Example 4 |

Comparative Examples C1-C5 and Examples 7-11: Fabric Drainage Test

All tests were run in a Miele W1914 front loading washing machine. The machine was loaded with 11 terry towels and 15 liters of water at a hardness of 10° french degree. Antifoam granules and/or drainage aid granules as noted in TABLE 7 were incorporated into 125 g of powder laundry detergent (Standard detergent formula 1998, ISO 105-C08:2010 available from wfk-Testgewebe GmbH) with a spatula before loading into the washing machine. The washing machine was then started using the Color program set at 40 °C, short program and 1,400 rpm. At the end of the rinse cycle, the load of terry towels was removed and weighted to check the residual water content in kg at the end of the wash.

TABLE 7

| | Ingredient | | | | |
|---|---|---|---|---|---|
| Example | Antifoam | g | Drainage Aid Granules | g | Residual water (kg) |
| C1 | Example AFG1 | 0.375 | Example 5 | 0.375 | 1.66 |
| C2 | Example AFG1 | 0.375 | Example 6 | 0.375 | 1.64 |
| C3 | — | — | Example 6 | 0.375 | 2.27 |
| C4 | Example AFG1 | 0.375 | — | — | 4.28 |
| C5 | Example AFC2 | 0.375 | — | — | 4.19 |
| 7 | Example AFG1 | 0.375 | Example 5 | 0.200 | 1.65 |
| 8 | Example AFG1 | 0.375 | Example 5 | 0.100 | 2.77 |
| 9 | Example AFG1 | 0.375 | Example 6 | 0.200 | 1.52 |
| 10 | Example AFG1 | 0.375 | Example 6 | 0.100 | 4.05 |
| 11 | Example AFC2 | 0.375 | Example 5 | 0.200 | 2.77 |

Synthesis 1: Crosslinked Cellulose Ether

The crosslinking agent used in Synthesis 1 was a linear poly(propyleneglycol) diglycidyl ether made from polypropylene glycol (PPG) having a molecular weight of ~400 Daltons and having the formula

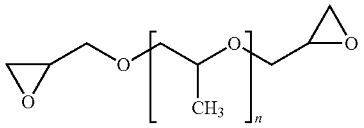

wherein n is 5.7 to 6.7 (available from Leuna-Harze GmbH, Leuna, DE as EPILOX™ M985 poly(propyleneglycol) diglycidylether crosslinker).

Ground cellulose flock (1.5 mol) was added to a 5 L autoclave. After purging the autoclave trice with nitrogen gas, the contents of the autoclave were heated to 40 °C. Then dimethylether (DME, 4.7 mol/mol of anhydroglucose units (AGU)) and methyl chloride (MCl; 3.2 mol/mol AGU) were injected into the autoclave. Causting soda (NaOH, strength 50 wt % aqueous, 1.9 mol NaOH/mol AGU) was added to the autoclave in 3 portions during 2 minutes at a temperature of 40 °C. The reaction mixture was held at 40 °C for 30 minutes. Ethylene oxide (0.45 mol/mol AGU) was then added and the reaction mixture was held for 10 minutes at 40 °C. The crosslinker (EPILOX™ M985 crosslinker; 0.0025 mol/mol AGU) was dissolved in 20 mL of isopropanol and added to the contents of the autoclave in six increments in 30 second intervals. The contents of the autoclave were then heated to 80 °C in 40 minutes. At 80 °C a water soluble monovalent copper ligant (MCL 2; 1.3 mol/mol AGU) was injected into the autoclave quickly. Afterwards, NaOH (0.67 mol/mol AGU) was added in 7 portions over 30 minutes, followed by a 70 minute cook-off time at 80 °C. Following this, the product crosslinked cellulose ether was washed in hot (>95 °C) water, neutralized with formic acid, granulated, dried and milled.

Comparative Example C6 and Examples 12-13: Detergent Tablet

Detergent tablets were prepared in each of Comparative Example C6 and Examples 12-13 having the composition set forth in TABLE 8. The polyethylene glycol was added to a vessel with heating set at 80 °C with stirring (4 bladed propeller at 200 rmp). Then the solvent (propylene glycol, deminieralized water, glycol ether solvent) were added to the vessel contents with continued stirring. Then the surfactancts (secondary alcohol ethoxylate, nonionic surfactant, sodium $C_{10-13}$ alkylbenzent sulfonate) were added to the vessel contents with continued stirring. The cellulose material (multifunctional cellulose derivative, Product of Example Si) was added to the vessel contents with continued stirring. The set point temperature was then reduced. When the temperature of the vessel contents reached 60 °C, the remaining components were added to the vessel contents with stirring until homogeneous. The vessel contents were then poured into a mold to form the detergent tablets. Once solidified, the detergent tablets were removed from the mold and allowed to set for 24 hours before testing.

TABLE 8

| | (wt %) | | |
|---|---|---|---|
| Ingredient | C6 | 12 | 13 |
| Polyethylene glycol[1] | 16.8 | 16.8 | 16.8 |
| Propylene glycol | 13.8 | 13.8 | 0 |
| Demineralized water | 0 | 0 | 13.8 |
| Glycol ether solvent[2] | 11.7 | 11.7 | 11.7 |
| Secondary alcohol ethoxylate[3] | 11.5 | 11.5 | 11.5 |
| Nonionic surfactant[4] | 8.0 | 8.0 | 8.0 |
| Sodium $C_{10-13}$ alkylbenzene sulfonate[5] | 26.0 | 26.0 | 26.0 |
| Multifunctional cellulose derivative[6] | 9.9 | 0 | 0 |
| Product Example S1 | 0 | 9.9 | 9.9 |
| Foam regulator[7] | 0.3 | 0.3 | 0.3 |
| Fragrance[8] | 0.9 | 0.9 | 0.9 |
| Enzyme[9] | 0.7 | 0.7 | 0.7 |
| Amylase[10] | 0.2 | 0.2 | 0.2 |
| Mannanase[11] | 0.2 | 0.2 | 0.2 |

[1]CARBOWAX ™ polyethylene glycol 8000 powder available from The Dow Chemical Company
[2]DOWANOL ™ DPnB solvent available from The Dow Chemical Company
[3]TERGITOL ™ 15-S-9 surfactant available from The Dow Chemical Company
[4]ECOSURF ™ EH-9 surfactant available from The Dow Chemical Company
[5]NANSA HS/80S $C_{10-13}$ alkylbenzene sulfonate available from Innospec Performance Chemicals
[6]SUPRACARE ™ 760 additive available from The Dow Chemical Company
[7]DOWSIL ™ AF-8017 antifoam available from The Dow Chemical Company
[8]Planet 34 fragrance available from Givaudan
[9]PREFERENZ ® P300 enzyme available from Essential Ingredients, Inc.
[10]PREFERENZ ® S210 amylase available from Essential Ingredients, Inc.
[11]PREFERENZ ® M100 alkaline mannanase available from Essential Ingredients, Inc.

Primary Cleaning Performance Test

The primary cleaning performance of the detergent tablets of Comparative Example $C_6$ and Examples 12-13 were assessed in a Miele W1614 with Program set to cotton/40 °C/1,000 rpm (124 min.). Each load took 10-11 liters of wash water with 25° French Hardness and 23 TAC. The soils used were 4 SBL 2004. Each load of laundry comprised 6 pillow cases, 5 huckaback towels and 1 bed sheet. Each load was prewashed (3 cycles) before testing. The stain fabrics (one with eleven stains-sebum with carbon black on Cotton; sebum with carbon black on polyester/cotton blend, grass/mud on polyester/cotton blend, dirty motor oil, tomato puree, chocolate drink on cotton, standard clay on cotton, red pottery clay on cotton, dry ink on cotton, spaghetti sauce and lard)(one with three stains-grass, balsamic salad dressing, and potato starch) were sewn onto a monitor placed in with the laundry load. Both of the monitors with stains were dried on drying line overnight. The stains were measured with a MACH 5+ instrument (L, a & b). The results are noted in TABLE 9, wherein ΔE* is according to the equation $$\Delta E^* = \Delta E_{aw} - \Delta E_{bw}$$

wherein $\Delta E_{aw}$ is measured from fabrics after washing, and $\Delta E_{bw}$ is measured from fabrics before washing. A higher ΔE* corresponds with better primary cleaning performance.

TABLE 9

| Fabric | Stain | Tablet Formulation | ΔE* |
|---|---|---|---|
| Cotton | Sebum with carbon black | Comp. Ex. C6 | 13 |
| | Sebum with carbon black | Example 12 | 11 |
| | Sebum with carbon black | Example 13 | 13 |
| | Chocolate drink | Comp. Ex. C6 | 7 |
| | Chocolate drink | Example 12 | 8 |
| | Chocolate drink | Example 13 | 10 |
| | Standard clay | Comp. Ex. C6 | 7 |
| | Standard clay | Example 12 | 6 |
| | Standard clay | Example 13 | 7.5 |
| | Red potter clay | Comp. Ex. C6 | 14 |
| | Red potter clay | Example 12 | 13 |
| | Red potter clay | Example 13 | 15 |
| | Dry ink | Comp. Ex. C6 | 23 |
| | Dry ink | Example 12 | 22 |
| | Dry ink | Example 13 | 22 |
| | Spaghetti sauce | Comp. Ex. C6 | 22 |
| | Spaghetti sauce | Example 12 | 21.5 |
| | Spaghetti sauce | Example 13 | 21.5 |
| | Lard | Comp. Ex. C6 | 38 |
| | Lard | Example 12 | 38.5 |
| | Lard | Example 13 | 37 |
| | Grass | Comp. Ex. C6 | 21 |
| | Grass | Example 12 | 17 |
| | Grass | Example 13 | 24 |
| | Balsamic salad dressing | Comp. Ex. C6 | 26 |
| | Balsamic salad dressing | Example 12 | 25 |
| | Balsamic salad dressing | Example 13 | 28 |
| | Potato starch | Comp. Ex. C6 | 43 |
| | Potato starch | Example 12 | 42 |
| | Potato starch | Example 13 | 43 |
| Poly/cotton blend | Sebum with carbon black | Comp. Ex. C6 | 16 |
| | Sebum with carbon black | Example 12 | 16 |
| | Sebum with carbon black | Example 13 | 15 |
| | Grass/mud | Comp. Ex. C6 | 14 |
| | Grass/mud | Example 12 | 12 |
| | Grass/mud | Example 13 | 14.5 |

TABLE 9-continued

| Fabric | Stain | Tablet Formulation | ΔE* |
|---|---|---|---|
| Knit cotton | Dirty motor oil | Comp. Ex. C6 | 15 |
| | Dirty motor oil | Example 12 | 13 |
| | Dirty motor oil | Example 13 | 15.5 |
| | Tomato puree | Comp. Ex. C6 | 25 |
| | Tomato puree | Example 12 | 23 |
| | Tomato puree | Example 13 | 24 |

Prophetic Example 14: Detergent Tablet

Detergent tablet is prepared in Prophetic Example 14 having the composition set forth in TABLE 10. The polyethylene glycol is added to a vessel with heating set at 80 °C with stirring (4 bladed propeller at 200 rmp). Then the solvent (propylene glycol, demineralized water, glycol ether solvent) are added to the vessel contents with continued stirring. Then the surfactancts (secondary alcohol ethoxylate, nonionic surfactant, sodium $C_{-10-13}$ alkylbenzent sulfonate) are added to the vessel contents with continued stirring. Then the cellulose material (multifunctional cellulose derivative, Product of Example S1) is added to the vessel contents with continued stirring. The set point temperature is then reduced. When the temperature of the vessel contents reaches 60 °C, the remaining components are added to the vessel contents with stirring until homogeneous. The vessel contents are then poured into a mold to form the detergent tablets. Once solidified, the detergent tablets are removed from the mold and allowed to set.

TABLE 10

| Ingredient | Prophetic Example 26 (wt %) |
|---|---|
| Polyethylene glycol[1] | 16.8 |
| Demineralized water | 13.6 |
| Glycol ether solvent[2] | 11.7 |
| Secondary alcohol ethoxylate[3] | 11.5 |
| Nonionic surfactant[4] | 8.0 |
| Sodium $C_{10-13}$ alkylbenzene sulfonate[5] | 26.0 |
| Product Example S1 | 9.9 |
| Foam regulator[6] | 0.3 |
| Product Example 6 | 0.2 |
| Fragrance[7] | 0.9 |
| Enzyme[8] | 0.7 |
| Amylase[9] | 0.2 |
| Mannanase[10] | 0.2 |

[1]CARBOWAX™ polyethylene glycol 8000 powder available from The Dow Chemical Company
[2]DOWANOL™ DPnB solvent available from The Dow Chemical Company
[3]TERGITOL™ 15-S-9 surfactant available from The Dow Chemical Company
[4]ECOSURF™ EH-9 surfactant available from The Dow Chemical Company
[5]NANSA HS/80S $C_{10-13}$ alkylbenzene sulfonate available from Innospec Performance Chemicals
[6]DOWSIL™ AF-8017 antifoam available from The Dow Chemical Company
[7]Planet 34 fragrance available from Givaudan
[8]PREFERENZ ® P300 enzyme available from Essential Ingredients, Inc.
[9]PREFERENZ ® S210 amylase available from Essential Ingredients, Inc.
[10]PREFERENZ ® M100 alkaline mannanase available from Essential Ingredients, Inc.[11]

We claim:

1. A laundry detergent formulation, comprising:

(A) 50 to 99.891 wt %, based on weight of the laundry detergent formulation, of a detergent component, wherein the detergent component comprises a detergent surfactant;

(B) 0.1 to 25 wt %, based on weight of the laundry detergent formulation, of a crosslinked cellulose ether containing 0.1 to 0.6 wt %, based on weight of the crosslinked cellulose ether, of polyether groups; and (C) >0.008 to 25 wt %, based on weight of the laundry detergent formulation, of a drainage aid component, wherein the drainage aid component comprises:

(i) 40 to 99 wt %, based on weight of the drainage aid component, of an organopolysiloxane comprising:

(a) 0 to 60 mol % of units of formula I $$R_x^1SiO_{(4-x)/2} \quad (I)$$

(b) 40 to 100 mol % of units of formula II $$R_y^1R_z^2SiO_{(4-y-z)/2} \quad (II)$$

wherein x is selected from the group consisting of 0, 1, 2 and 3; wherein y is selected from the group consisting of 0, 1 and 2; wherein z is selected from the group consisting of 1 and 2; with the proviso that y+z is 1, 2 or 3; wherein each $R^1$ is independently selected from a hydrogen, a hydroxy group and a group having 1 to 8 carbon atoms; wherein each $R^2$ is an $-A_cR^3$ group; wherein A is a divalent linking group; wherein c is selected from the group consisting of 0 and 1; wherein each $R^3$ is independently selected from a group having 9 to 35 carbon atoms;

(ii) 1 to 30 wt %, based on weight of the drainage aid component, of an o rganosilicon resin; and (iii) 0 to 30 wt %, based on weight of the drainage aid component, of a hydrophobic additive;

with proviso that when the laundry detergent formulation contains ≥0.02 wt %, based on weight of the laundry detergent formulation, of the drainage aid component, the laundry detergent formulation will also contain at least 0.1 wt %, based on weight of the laundry detergent formulation, of the crosslinked cellulose ether containing 0.1 to 0.6 wt %, based on weight of the crosslinked cellulose ether, of polyether groups.

2. The laundry detergent formulation of claim 1, wherein the laundry detergent formulation is in a solid format selected from the group consisting of a laundry detergent tablet, a granulated laundry detergent and a powder laundry detergent.

3. The laundry detergent formulation of claim 2, wherein the detergent component further comprises at least one of a builder, a filler, an enzyme, a pigment, a colorant, a solvent, a binder, a bleaching agent, a bleach activator, a stabilizer, a foam regulator, an optical brightener, a processing aid and a fragrance.

4. The laundry detergent formulation of claim 3, wherein the laundry detergent formulation contains ≥0.008 to <0.02 wt %, based on weight of the laundry detergent formulation, of the drainage aid component.

5. The laundry detergent formulation of claim 4, wherein the organopolysiloxane is a linear organopolysiloxane of formula III (III)

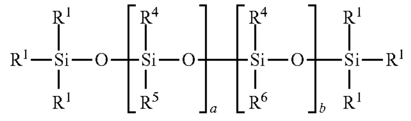

wherein each $R^1$ is a methyl group; wherein each $R^4$ is independently selected from the group consisting of a hydrogen, a group having 1 to 8 carbon atoms, an $R^5$ and an $R^6$; wherein each $R^5$ is an $-A_cR^7$ group; wherein each $R^7$ is independently selected from an acyclic group having 10 to 20 carbon atoms; wherein c is selected from the group consisting of 0 and 1; and wherein A is a divalent linking group consisting of (i) oxygen; (ii) carbon and hydrogen or (iii) carbon, hydrogen, oxygen, and optionally, nitrogen, sulfur or phosphorus; wherein each $R^6$ is independently selected from the group consisting of styrene, α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4-dimethylstyrene, 2,5-dimethylstyrene, 2,4,6-trimethylstyrene and mixtures thereof; wherein a is 10 to 500 and wherein b is 0 to 250; wherein a +b is 10 to 500; wherein a>b; and wherein ≥60 mol % of the Si atoms in the linear organopolysiloxane of formula III have an $R^5$ group attached.

6. The laundry detergent formulation of claim 5, wherein the crosslinked cellulose ether is an irreversibly crosslinked cellulose ether.

7. The laundry detergent formulation of claim 6; wherein the irreversibly crosslinked cellulose ether comprises a base cellulose ether and crosslinks; wherein the crosslinks contain the polyether groups; wherein the base cellulose ether contains hydroxyalkyl ether and alkyl ether groups; wherein the polyether groups in the irreversibly crosslinked cellulose ether are polyoxyalkylene groups having 2 to 100 oxyalkylene groups; wherein the polyoxyalkylene groups are selected from the group consisting of a polyoxyethylene, a polyoxypropylene and combinations thereof; and wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof.

8. The laundry detergent formulation of claim 5, wherein the detergent component further comprises: a foam regulator.

9. A method of washing a soiled fabric article, comprising: providing a soiled fabric article; providing a laundry detergent formulation according to claim 8; providing a wash water; providing a rinse water; applying the wash water and the laundry detergent formulation to the soiled fabric article to provide a washed fabric article; and rinsing the washed fabric article with the rinse water.

* * * * *